United States Patent [19]
Jaunarajs et al.

[11] 3,835,219
[45] Sept. 10, 1974

[54] METHOD FOR THE PREPARATION OF FIBROUS SOLUBLE CALCIUM SULFATE ANHYDRITE

[75] Inventors: Karlis L. Jaunarajs, Somerville; Julie C. Yang, Somerset, both of N.J.

[73] Assignee: Johns Manville Corporation, New York, N.Y.

[22] Filed: Aug. 16, 1972

[21] Appl. No.: 281,268

[52] U.S. Cl. ................................. 423/555, 106/111
[51] Int. Cl. ............................................ C01f 11/46
[58] Field of Search................... 423/555, 172, 170; 106/110, 111

[56] References Cited
UNITED STATES PATENTS

| | | | |
|---|---|---|---|
| 757,649 | 4/1904 | Brothers | 106/110 |
| 1,708,436 | 4/1929 | Weinstein | 106/110 |
| 1,901,051 | 3/1933 | Randel et al. | 423/172 |
| 2,151,331 | 3/1939 | Roberts | 423/555 |
| 2,448,218 | 8/1948 | Haddon | 106/111 |

Primary Examiner—Oscar R. Vertiz
Assistant Examiner—Hoke Miller
Attorney, Agent, or Firm—Robert M. Krone; James W. McClain

[57] ABSTRACT

A process is described for the formation of fibrous soluble calcium sulfate anhydrite, the fibers thereof having specified dimensions. In the process an aqueous suspension of gypsum is first formed and converted to the fibrous soluble anhydrite by reaction in the presence of saturated steam at 140°C to 200°C for up to 3.0 hours.

5 Claims, No Drawings

METHOD FOR THE PREPARATION OF FIBROUS SOLUBLE CALCIUM SULFATE ANHYDRITE

BACKGROUND OF THE INVENTION

1. Field of the Invention

The invention herein relates to the formation of fibrous soluble calcium sulfate anhydrite.

Research has been carried on for years on the conversion of gypsum ($CaSO_4 \cdot 2H_2O$) into the various forms of its hemihydrate ($CaSO_4 \cdot 1/2H_2O$), sometimes referred to as plaster of Paris, and its anhydrite ($CaSO_4$). The anhydrite exists in two forms, commonly referred to as the soluble form and the insoluble form, on the basis of their relative solubilities in water at approximately ambient temperature. The soluble anhydrite can occur in more than one crystalline form, one of which is a fibrous form. In the fibrous form, the soluble anhydrite serves as an excellent reinforcing material for polymeric resins. Incorporation of the fibrous anhydrite into the resin generally significantly increases the strength of the resinous material; often the strength is increased over that which would be obtained by reinforcing the same resin with a conventional fibrous material such as asbestos.

Because of this special utility of the fibrous soluble anhydrite to which the nonfibrous forms are not amenable, it would be advantageous to have a process which would selectively produce fibrous soluble anhydrite to the exclusion of nonfibrous soluble anhydrite, insoluble anhydrite, and/or hemihydrate.

2. Description of the Prior Art

There is a wide variety of patents and articles discussing various aspects of soluble anhydrite formation from gypsum. Typical descriptive articles which describe the soluble anhydrite and its properties are those by Riddell in the May, 1950, issue of *Rock products*, page 68, and by Bauer in the April, 1952, issue of *Pit and Quarry*, page 113. The book *The Chemistry of Cement and Concrete* by Lea describes properties of gypsum and its derivatives on page 18. Various aspects of the formation of soluble anhydrite by calcination of gypsum at high temperature in the presence of steam under pressure are disclosed in U.S. Pats. Nos. 1,931,240; 1,941,188; 1,989,712; 2,448,218; 2,460,267; and 3,579,300. Crystal habit modifiers are described in U.S. Pat. Nos. 2,907,668 and 3,520,708.

BRIEF SUMMARY OF THE INVENTION

The invention herein is a novel and specific process for the formation of fibrous soluble calcium sulfate anhydrite with the fibers thereof having specified dimensions. These fibers have been found to be quite useful for reinforcement of organic polymeric matrices, for use of these fibrous soluble anhydrites as reinforcing agents substantially increases the strength of polymeric materials. Often the strength of the fibrous soluble anhydrite reinforced materials is significantly greater than that of similar polymeric materials reinforced by conventional fibrous materials such as asbestos. The process comprises first forming an aqueous suspension of gypsum which is not greater than 0.4 molar in gypsum. The gypsum used is ground or otherwise comminuted to a particulate form in which at least 90% of the particles are minus 4 mesh in size. The suspension may also contain a crystal habit modifier which is suitable for formation of the fibrous soluble anhydrite. Following formation of the suspension, the gypsum in the suspension is converted to the fibrous soluble anhydrite by reaction in a pressure vessel in the presence of saturated steam at a temperature in the range of from 140°C to 200°C for a period of up to 3.0 hours, thereby forming fibers of soluble calcium sulfate anhydrite having an overall average length in the range of from 25 to 70 microns, individual maximum lengths generally not exceeding 150 microns, and aspect ratios in the range of from 10:1 to 100:1.

DETAILED DESCRIPTION OF THE INVENTION

The invention herein is a process for the formation of fibrous soluble calcium sulfate anhydrite. The invention also encompases organic polymeric materials reinforced with fibers of the fibrous soluble calcium sulfate anhydrite. By the process of this invention, fibrous soluble anhydrite may be produced to the virtual exclusion of non-fibrous soluble anhydrite, insoluble anhydrite, and/or calcium sulfate hemihydrate. The fibers produced by the process of this invention serve as excellent reinforcing agents for organic polymeric matrices, significantly increasing the strength thereof.

The process of this invention is a process for the formation of fibrous soluble calcium sulfate anhydrite, the fibers thereof having an overall average length in the range of from 25 to 70 microns, individual maximum lengths not exceeding 150 microns, and aspect ratios in the range of from 10:1 to 100:1; which comprises: forming an aqueous suspension of gypsum, said suspension being not greater than 0.4M in gypsum, and said gypsum prior to dispension being in the form of particles at least 90% of which are minus 4 mesh in size; and converting the gypsum in said suspension to said fibrous soluble anhydrite by reaction in a pressure vessel in the presence of saturated steam at a temperature in the range of from 140°C to 200°C for a period of up to 3.0 hours, thereby forming fibers of soluble calcium sulfate hemihydrate having an overall average length in the range of from 25 to 70 microns, individual maximum lengths generally not exceeding 150 microns, and aspect ratios in the range of from 10:1 to 100:1.

In the process herein, a specified form of fibrous soluble calcium sulfate anhydrite is formed from gypsum. The process is carried out in a conventional pressure vessel (such as an autoclave) which is preferably equipped with means for stirring the aqueous suspension of gypsum. The pressure vessel also is equipped with means for supplying saturated steam to the autoclave in order to maintain the proper temperature and pressure within the vessel.

In the pressure vessel, the temperature during the reaction period is maintained in the range of 140°C to 200°C, preferably in the range of 140°C to 160°C. Since this temperature represents the temperature of saturated steam, there will be associated the pressure of the saturated steam at the given temperature. Consequently, the attendant steam pressure will be approximately 52 to 226 psia, preferably about 52 to 90 psia.

The basic raw material used in the process of this invention is gypsum, calcium sulfate dihydrate. The gypsum used herein may be pure or substantially pure gypsum or it may be a commercial grade containing a small amount of impurities (such as calcite) which do not significantly affect the formation of the fibrous soluble anhydrite. Best results are obtained when the gypsum is ground, crushed, or otherwise comminuted to a particulate form in which at least 90% of the particles are of minus 4 mesh in size. Preferably approximately 80% of the particles will be minus 60 mesh in size. The comminuted gypsum is then suspended in water to form an aqueous slurry which has a concentration not greater than 0.4M in gypsum and preferably not greater than 0.26M. At greater concentrations, the slurry has been found to be too thick to produce a uniform degree of formation of the fibrous soluble anhydrite.

The suspension may also contain a small amount of a crystal habit modifier which is suitable for the formation of the fibrous soluble anhydrite. These are generally acids such as boric, succinic, adipic, malonic, sebacic, and similar acids or their salts, as well as salts such as sodium chloride, sodium sulfate, aluminum sulfate, and zinc sulfate. Preferred among these is boric acid. The crystal habit modifier will be present in an amount of from 0.1 to 5 weight percent, preferably 0.25 to 1.5 percent.

As noted above, the pressure vessel in which the reaction is carried out should be equipped with means for stirring or otherwise mildly agitating the gypsum slurry during the reaction. Such stirring may be continuous or intermittent throughout the reaction period.

Reaction time will be in the range of up to 3.0 hours, preferably 0.5 to 2.5 hours. Reaction times will be inversely related to the temperature in most cases, with longer reaction times necessary for complete conversion to the fibrous soluble anhydrite at the lower reaction temperatures. Since conversion to the fibrous soluble anhydrite is virtually complete at temperatures within the above range in 3 hours, and usually within 2.5 hours, heating for a longer period is normally not justified.

The following examples will illustrate the process of this invention.

Example 1

A commercial gypsum containing a minimum calcium sulfate content of 64.5% and being in particulate form in which 98% of the particles were of minus 20 mesh in size, was suspended in water to form a 0.23M suspension. The suspension also contained 1.0 weight percent of boric acid. On reaction for 2 hours in the presence of saturated steam at an average temperature of about 145°C a slurry was formed containing essentially all fibrous soluble anhydrite. The fibrous soluble anhydrite had individual fiber lengths in the range of from 10 to 60 microns with an average fiber length of 30 microns. The reaction was conducted in a commercial 1 gallon capacity stainless steel autoclave equiped with a stirrer. The stirrer was run at 300 rpm during the entire 2 hour reaction period.

Example 2

The reaction conditions of Example 1 were repeated with the exception that the reaction time was extended to 140 minutes. The product, which was essentially all fibrous soluble anhydrite, had individual fiber lengths in the range of from 10 to 80 microns with an average fiber length of 30 microns.

Example 3

The commercial gypsum of Example 1 was suspended in water to form a 0.23M solution. No boric acid was added. After reaction for 60 minutes at 150°C a product composed essentially all of fibrous soluble anhydrite was formed. The individual fiber lengths were in the range of 20 to 150 microns, with an average length of 60 microns.

Example 4

The commercial gypsum of Example 1 was suspended in water to form a 0.20M solution. No boric acid was added. After reaction for 30 minutes at an average temperature of about 152.5°C a product was formed which was composed essentially all of fibrous soluble anhydrite. The individual fiber lengths were in the range of 20 to 140 microns with an average fiber length of 60 microns.

The invention herein also contemplates the incorporation of the fibrous soluble anhydrite into organic polymeric resin matrices. A wide variety of organic resins are suitable as matrices which can be reinforced by the fibrous soluble anhydrite. These include polyesters, polyolefins such as polyethylene and polypropylene, poly(vinyl halides) such as poly(vinyl chloride), and polystyrene. The weight ratio of polymeric resin to fibrous soluble anhydrite will be in the range of from about 2:1 to about 12:1, preferably 2:1 to 6:1. If desired, the polymeric matrix can be extended by addition of up to about 50% of filler. Also included may be small amounts of conventional stabilizers, antioxidants, pigments, etc., used in such polymeric matrices.

What we claim is:

1. A process for the formation of fibrous soluble calcium sulfate anhydrite, the fibers thereof having an overall average length in the range of from 25 to 70 microns, individual maximum lengths not exceeding 150 microns, and aspect ratios in the range of from 10:1 to 100:1; which comprises:
    a. forming an aqueous suspension of gypsum, said suspension being not greater than 0.4 molar in gypsum, and said gypsum prior to the dispersion being in the form of particles at least 90% of which are minus 4 mesh in size; and
    b. converting the gypsum in said suspension to said fibrous soluble anhydrite by reaction in the pressure vessel in the presence of saturated steam at a temperature in the range of from 140°C to 200°C for a period of from 0.5 to 2.5 hours, thereby forming fibers of soluble calcium sulfate anhydrite having the aforesaid dimensions.

2. The process of claim 1 wherein said temperature is in the range of 140°C to 160°C.

3. The process of claim 1 wherein said aqueous suspension is not greater than 0.26 molar in gypsum.

4. The process of claim 1 wherein said aqueous suspension also contains 0.1 to 5 weight percent of a crystal habit modifier suitable for the formation of fibrous soluble calcium sulfate anhydrite and selected from the group consisting of boric, succinic, adipic, malonic and sebacic acids and salts thereof; sodium, aluminum and zinc sulfates and sodium chloride.

5. The process of claim 4 wherein said crystal habit modifier is boric acid.

* * * * *